United States Patent
Wydall et al.

[19]

[11] Patent Number: 6,117,186
[45] Date of Patent: Sep. 12, 2000

[54] SYSTEM AND METHOD FOR EASY LOADING OF CD-ROM COMPUTER SOFTWARE WITHOUT INSTALLATION PROCESS

[75] Inventors: Miles Ashley Wydall, Birkdale; Adrian Cook, Lutwyche, both of Australia

[73] Assignee: DVP Media Pty Ltd., Brisbane, Australia

[21] Appl. No.: 09/007,399

[22] Filed: Jan. 15, 1998

[51] Int. Cl.[7] ................................................. G06F 9/445
[52] U.S. Cl. ............................................................ 717/9
[58] Field of Search ................................. 395/709; 717/9

[56] References Cited

U.S. PATENT DOCUMENTS

| | | | |
|---|---|---|---|
| 5,331,423 | 7/1994 | Ota et al. | 386/125 |
| 5,581,768 | 12/1996 | Garney et al. | 709/104 |
| 5,630,093 | 5/1997 | Holzhammer et al. | 711/115 |
| 5,631,358 | 5/1997 | Franssen et al. | 536/24.1 |
| 5,633,843 | 5/1997 | Gupta et al. | 369/32 |
| 5,642,417 | 6/1997 | Stringer | 380/4 |
| 5,754,817 | 5/1998 | Wells et al. | 711/203 |
| 5,787,493 | 7/1998 | Niijima et al. | 711/204 |
| 5,794,032 | 8/1998 | Leyda | 713/2 |
| 5,795,156 | 8/1998 | Redford et al. | 434/118 |
| 5,822,784 | 10/1998 | Garney | 711/208 |
| 5,835,759 | 11/1998 | Moore et al. | 713/1 |
| 5,933,645 | 8/1999 | Wallack | 717/12 |

OTHER PUBLICATIONS

Madigan et al., Lessons learned prototyping an SGML–based computerized document management system, Jun. 1997, p. 139–143.

Phillips Business Information, Inc., Video Technology News, Nov. 7, 1994, 1–2.

M2 Communications, Interleaf; Interleaf Launches World View electronic Viewer for Java, Nov. 4, 1996, 1–3.

Newsbytes, Delrina Previews Echo Lake for Windows, May 1, 1995, 1–2.

*Primary Examiner*—Tariq R. Hafiz
*Assistant Examiner*—John Q. Chavis
*Attorney, Agent, or Firm*—Kenyon & Kenyon

[57] ABSTRACT

A computer program executed by a computer that allows non-technical people to easily use CD-ROM computer programs without undertaking an installation process. The user simply places the CD-ROM disk in the computer's CD-ROM drive, and it will start to play on any standard computer. The data on the CD-ROM is provided to the host PC system to suit the characteristics of the host PC system, rather than modifying the host PC system to suit a standard playback process or the data on the CD-ROM. The contents of the CD-ROM (e.g., the video data) can be made to appear to be modified since the player engine on the disk can compensate for variations in the host PC system by analysing the host PC configuration and modifying the playback process to suit that system.

22 Claims, 3 Drawing Sheets

Fig. 1

Fig. 2

SYSTEM AND METHOD FOR EASY LOADING OF CD-ROM COMPUTER SOFTWARE WITHOUT INSTALLATION PROCESS

FIELD OF INVENTION

The present invention generally relates to multimedia computer software of the type stored on compact disk read only memory (CD-ROM) devices, and more particularly, to a computer system and method for the easy loading and running of computer programs that are stored on CD-ROMs.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Many computer programs are distributed on CD-ROMs. A CD-ROM can store a large amount of information, such as a series of computer programs or a multimedia program and its associated data files. At current standards, a CD-ROM can store approximately 650 megabytes of data.

Examples of programs distributed on CD-ROMs include multimedia encyclopedias, interactive training programs, computer games, suites of business programs, and electronic books. Such programs often include a number of formats of information that can be used at the same time, such as graphics, sound, animations, video, text, etc.

Typically, before using a program stored on CD-ROM for the first time, the user is required to install the program.

One of the biggest failings of the CD-ROM industry is that many programs are difficult to install from CD-ROM. Average CD-ROM users are not technical boffins. But many multimedia programs on CD-ROM require the user to reconfigure their personal computer ("PC") so that they can run the CD-ROM. For example, it was reported that more than 50% of purchasers of Disney's Lion King CD-ROM product returned the CD-ROM because they could not load it successfully.

Installation of a program from a CD-ROM requires significant skill and understanding on the part of the user, especially for programs that take advantage of sound and video features of modern PCs. For example, the proliferation of different kinds of sound cards and video displays from various manufacturers requires a user to know both the specific configuration details of the adaptors used in the computer and even specific configuration details of the adaptors (e.g., address space, interrupt number).

An installation program can often assist in the installation process, but does not solve all installation problems. The installation program, when executed, will typically ask the user which components of the main program the user would like installed (e.g., a "standard" installation or a customer installation) and where on the hard disk the user would like the majority of components installed. As part of the installation process, the installation program copies program files, drivers and data files to the user's hard disk and makes changes to existing configurations.

In a Windows® environment (Microsoft Corp., Redmond, Wash.), for example, the installation procedure can be summarised as comprising the following steps:

A. Determine what resources (e.g., DLLs and fonts) have been previously installed (e.g., by other programs).
B. Obtain information about the system, e.g., operating system, hardware components, etc.
C. Modify existing resources, e.g., WIN.INI, SYSTEM.INI, AUTOEXEC.BAT and CONFIG. SYS
D. Add new resources, such as program files (executables), data files, DLLs, fonts, OBXs etc.

According to the Microsoft Press Computer Dictionary, 3rd Edition 1997, an installation program is "a program whose function is to install another program, either on a storage medium or in memory. An installation program might be used to guide a user through the often complex process of setting up an application for a particular combination of machine, printer, and monitor." Application programs commonly include a disk-based installation program that does most of the work of setting up the program to work with the computer, printer and other devices. "Often such a program can check for devices attached to the system, request the user to choose from sets of options, create a place for the program on the hard disk, and modify system startup files as necessary."

As the above definition makes clear, the installation process is complex. Often, particularly for games and multimedia programs, it is unsuccessful. Even if the program is successfully installed, the modifications that the installation program makes to the system often results in other programs not operating correctly, sound and video being corrupted, and overall system degradation.

Accordingly, due to difficult and often unsuccessful installation, the multimedia and game CD-ROM industry experiences high levels of customer dissatisfaction, product returns and customer support requests.

In short, installation of CD-ROM disks is a tedious, time consuming and error prone process, requiring an intimate knowledge of the PC system, the drive, the program on the CD-ROM disk, and their dependencies and interactions.

There is a need for a CD-ROM software system that allows a user to operate the software on the CD-ROM just like a video tape or music compact disk—the user just inserts the disk and it starts "playing" correctly, without the need for complex installation procedures. Moreover, such a system should be compatible with currently used popular computer hardware, operating systems and software.

Some existing systems have attempted to solve the installation problem. For example, a standard known as CD-i allows users to more easily run multimedia software products. A CD-i disk containing a multimedia product or computer game can be loaded and played on a CD-i player with minimal effort. However, the CD-i standard is not compatible with CD-ROM.

CD-i (Compact Disk Interactive) is a hardware and software standard for a form of optical disk technology that can combine audio, video, and text on high-capacity compact disks. Developed jointly by N.V. Philips of the Netherlands and Sony Corporation in Japan, CD-i includes such features as image display and resolution, animation, special effects, and audio. The CD-i standard covers methods of encoding, compressing, decompressing, and displaying stored information. To use a CD-i disk, the user must have CD-i hardware which includes a CD-i operating system. CD-i hardware can be connected directly to a television or color monitor.

Although CD-i is regarded by some as the first multimedia technology aimed at a mass audience, it has a number of drawbacks: (I) The CD-i player is not compatible with CD-ROM products. Besides CD-i discs, CD-i player can play Compact Disc-Digital Audio (CD-DA), CD+Graphics (CD+G), Photo CD, and, with a Digital Video cartridge, Karaoke CD and Video CD discs, but not CD-ROM disks. (II) An Intel-based computer running a Microsoft Windows operating system can not play CD-i software. If a computer has a MPEG card and some MPEG viewing software, the user can view video CDs. However, such cards will not allow the user to play CD-i software. While there are CD-i cards that allow some computers to emulate a CD-i player, they are available mainly to developers. (III) It is difficult for a multimedia developer to create programs compatible for both CD-ROM and CD-i formats. It is not trivial to port a CD-ROM title to CD-i. It is estimated that title development is about 25 to 50% platform specific and 50 to 75% platform independent. In case of authoring, the actual process of scripting and assembling the presentation is platform specific. In the case of custom C programming, the software design and implementation is largely platform specific.

In short, the CD-i standard is not compatible with the Microsoft Windows operating system, which is used by most computers. The CD-i standard, as it is a standard, does not have to deal with many different configurations of hardware and software drivers. CD-i players (as well as other proprietary operating system players such as the 3DO player and Tandy's VIS) can only play disks which are developed for that particular player and cannot play widely available CD-ROMs for personal computers.

There are extensions to the CD-i system. For example, U.S. Pat. No. 5,331,423 titled "Disc Player With An Automatic Initialization Function" is directed to a variation on a CD-i player that has the capability to store and recognise the characteristics of different format discs other than CD-i and play them. The player requires a memory for storing disk types and means for identifying disk types. However, the '423 patent does not teach or suggest how to install CD-ROM disks on personal computers.

U.S. Pat. No. 5,633,843 titled "User Friendly Compact Disk (CD) Read Only Memory (ROM) Player" is directed to a CD-ROM player which, it is claimed, can be installed and used as simply as a VCR. This CD-ROM player requires that a database be maintained on the hard drive of the PC, identifying the installation procedures of all known CD-ROM disks. The '843 patent does not fully explain the mechanism for carrying out the appropriate installation process for new CDs that are not already listed in the database: it is uncertain how a new CD-ROM identifies the hardware configuration of the user's PC and determines the appropriate sequence of installation commands.

U.S. Pat. No. 5,642,417 titled "Virtualized Installation of Material" is directed to a system to permit automatic installation and uninstallation of new material. This system preserves the state of the system prior to installation of software, performs a "virtual" installation process, redirecting certain resources so that the software believes that a regular installation has occurred, then restores the system to its former state afterwards. Prior installed "resources" must be "saved on separate material." This method could be useful for temporary reconfiguration of systems, but is inefficient for software that is to be permanently installed or used often.

Accordingly, there is a need for an installation system and method that allows a CD-ROM to be easily installed on a PC, in a way that does not adversely effect other programs and resources. The method should be easy for non-technical people to use, and thus require no decision making on the part of the user. The method should work successfully regardless of the configuration of the host system.

SUMMARY OF THE INVENTION

The present invention allows non-technical people to easily use CD-ROM computer programs without undertaking an installation process. The user simply places the CD-ROM disk in the computer's CD-ROM drive, and it will start to play on any standard computer.

For the purpose of this disclosure, a "standard computer" includes a PC or MPC with an Intel-based processor 486 or above (or compatible) and a sound card, running a Windows operating system (e.g. Windows 3.1 or Windows 95) or similar.

The present invention is ideally suited for use with computer games and sophisticated multimedia products, such as, for example, electronic encyclopedias and multimedia training products that have interactive video segments, where current installation procedures are complex and error prone. The present invention will, of course, work successfully with other types of computer programs.

The following example will show how a CD-ROM product containing video data can run without the need for an install process. The example assumes an Intel processor and a Microsoft Windows operating system. When the CD-ROM disk is placed in the CD-ROM drive, the operating system will usually "autoload" a program on the CD-ROM. According to the present invention, the program on the CD-ROM which is autoloaded can perform the following representative steps:

I. Determine if this CD-ROM title has been run on this particular PC previously.

II. If it is the first time this title has been run on this particular PC:
  a. query the operating system of the PC to determine the processor type and the essential software and hardware components and video drivers, etc. that are already installed;
  b. run a test segment, e.g., a test video or audio/video segment;
  c. while running the test segment, determine the relevant characteristics of the PC system (e.g., analyze the throughput of the processor and determine the optimum frame rate and image size for this PC);
  d. store the optimum details determined in step c in one line of the WIN.INI file;
  e. run the video segments directly from the CD-ROM without copying such segments to the hard drive of the PC;

III. If this is not the first time this title has been run on this particular PC:
  a. obtain the optimum details stored at step d above from the WIN.INI file
  b. run test segment testing the audio
  c. run the video segments directly from the CD-ROM without copying such segments to the hard drive of the PC.

According to the present invention, the only information, data or program stored on the hard disk of the user's PC during the load and run process is the single line in the WIN.INI file. No other information is loaded onto, changed or deleted from the hard disk. Alternatively, the information stored in the WIN.INI file can instead be stored in a very small data file created by the present invention.

The above method can be characterised as running a CD-ROM without an installation process. The user is not involved in any decision-making and is not required to choose from sets of options; no program is stored on the hard disk; no video drivers such as MPEG video drivers are required to be present; and no system startup files are necessarily modified.

It will be appreciated that the step of determining the relevant characteristics of the PC system does not require identification of the components of the PC system. What is considered are the characteristics of the components in actual operation, not their identity.

The present invention can be implemented in computer code and stored on a disk, such as a CD-ROM. The computer code is processed by the processor of a computer.

According to the present invention, the data (e.g., video data) on the CD-ROM is "modified" to suit the host PC system, rather than modifying the host PC system to suit a standard playback process or the data on the CD-ROM. The contents of the CD-ROM (e.g., the video data, audio, etc.) can be made to appear to be modified since the player engine on the disk can compensate for variations in the host PC system by analysing the host PC configuration and modifying the playback process to suit that system. There is no need to alter the host PC system in any way. In fact, the present invention does record the result of the system analysis in the win.ini file of the host PC system for convenience, though this is not essential. This step of the present invention does not in any way alter the configuration or performance of the host PC—it merely eliminates the need to perform the same system analysis every time a disk is inserted. The win.ini file information simply informs the CD-ROM of the optimum mode for playback which has already been determined via a prior analysis of this particular system.

This is in sharp contrast to prior art systems, e.g., U.S. Pat. No. 5,642,417 discussed above. One key assumption of the '417 patent is that CD-ROMs are not able to modify their contents without altering the host PC system, so the goal of that system was to perform a less permanently intrusive modification and restoration of the host. The present invention takes a different approach to this problem—during runtime, "modify" the contents of the CD-ROM to compensate for variations in the host PC system.

Accordingly, the present invention allows programs on CD-ROM to be easily used, in a way that does not adversely effect the host PC system.

DETAILED DESCRIPTION

Figure 1:
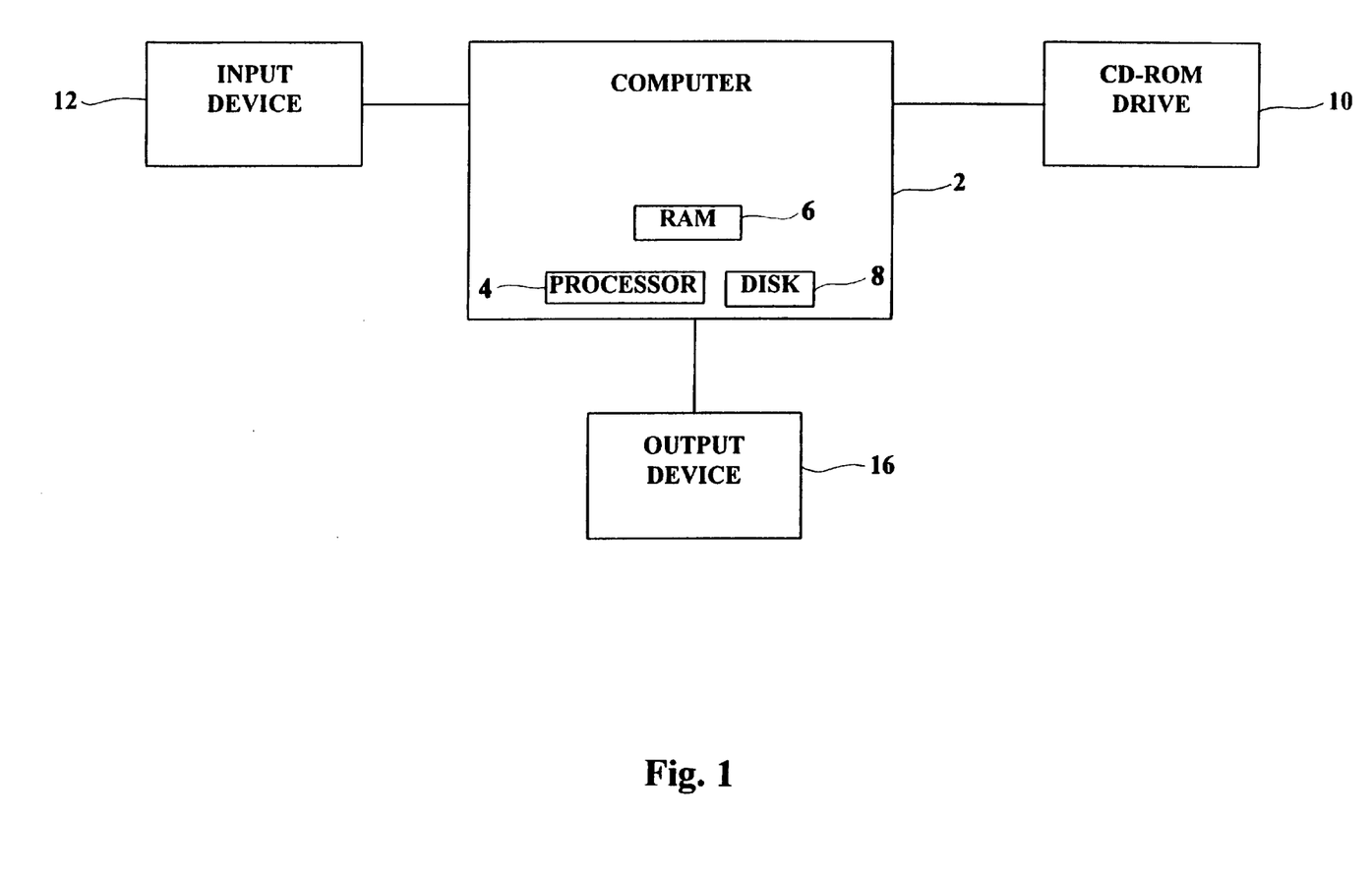
FIG. 1 is a block diagram illustrating typical hardware components used in conjunction with the present invention.

Referring now to the drawings, and initially FIG. 1, there is illustrated in block diagram form a representative hardware environment for use in conjunction with the present invention. A computer 2, such as a multimedia personal computer (MPC), comprises a processor 4, such as an Intel Pentium processor, RAM 6 and a hard disk drive and hard disk 8. Although the processor 4 can be any computer processing device, the representative embodiment of the present invention will be described herein assuming that the processor 4 is an Intel 486 processor or higher. The hard disk 8 stores an operating system, such as the Microsoft Windows 95 or Windows 3.1 operating system, which is executed by processor 4. The hard disk 8 also stores operating system configuration files, such as WIN.INI, SYSTEM.INI, AUTOEXEC.BAT and CONFIG.SYS. The present invention is not limited to the Windows operating system, and with suitable adaptation, can be used with other operating systems. For ease of explanation, the representative embodiment as described herein assumes the Windows 95 or Windows 3.1 operating system.

When used in this document, the term "multimedia" includes "hypermedia." The term "video" includes MPEG format video.

Coupled to the computer 2 is a CD-ROM drive 10 which is capable of reading CD-ROM disks. In the representative embodiment of the present invention, the drive 10 conforms to the CD-ROM standard. However, the present invention is not so limited, and can be implemented in conjunction with other disk standards used with PCs, including writeable CD formats and DVD.

According to the representative embodiment, the computer code implementing the present invention is stored on a disk that can be read by drive 10 and executed by processor 4.

Coupled to the computer 2 are one or more input devices 12, such as a keyboard, mouse, joystick, trackball, microphone, scanner, and the like. Also coupled to the PC are one or more output devices 16, such as a monitor, sound speakers, printer, and the like.

Figure 2:
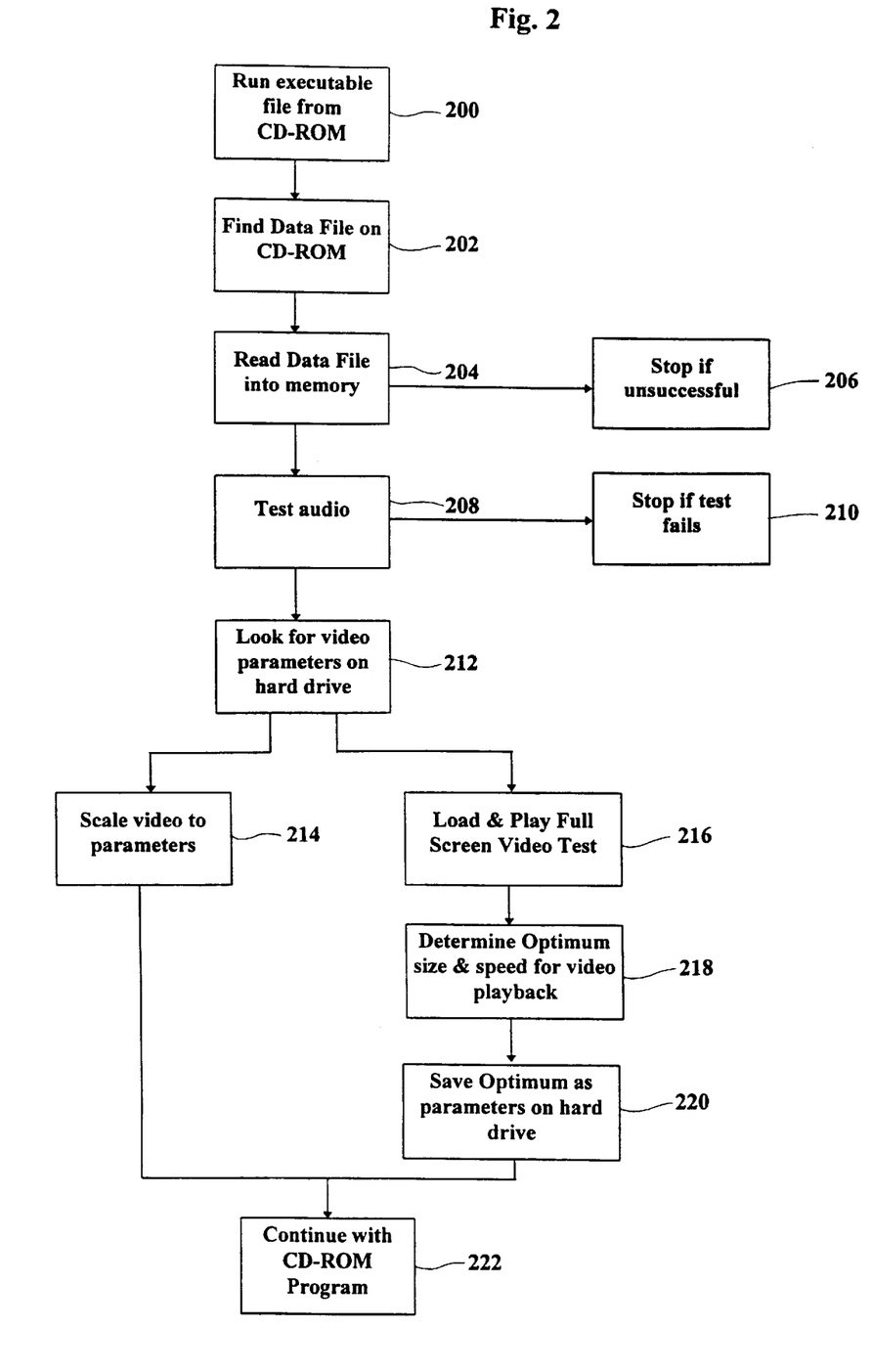
FIG. 2 is a flowchart representing the high level steps performed according to the representative embodiment of the present invention.

FIG. 2 illustrates in flow chart form representative high-level steps performed according to the present invention.

At step 200, an executable file is run from the CD-ROM disk which is loaded from the CD-ROM drive 10. The executable file controls the initial operation of the program (e.g., a multimedia or hypermedia program, called herein the "CD-ROM program") stored on the CD-ROM disk.

At step 202, the executable file from the previous step finds the appropriate data file. In the representative embodiment, the data file is named "data.mnu". The data.mnu file is a script that comprises the description of the navigational paths and hotspots for the CD-ROM program. The data file is read into memory (step 204), and the process will stop if this is unsuccessful (step 206).

At step 208, an audio test is run to ascertain if the computer 2 has the appropriate sound card and drivers installed. If not, the process stops as the CD-ROM program will not operate with full functionality (step 210).

At step 212, the hard disk 8 is examined to determine if this CD-ROM program has been used on this computer 2 previously. If this CD-ROM program previously has been used on this computer 2, then the video parameters for this CD-ROM program will have been stored on the hard disk 8. The video parameters may be stored in a file specially and previously created by the CD-ROM program (e.g., cdnav.ini) or in a line in the WIN.INI file. If the video parameters are found, then the video is scaled to the appropriate size and/or frame rate (step 214). In the representative embodiment, the video parameters comprise the length of the X side of the video frame; Y side length can be determined therefrom.

If the CD-ROM program has not previously been used on this computer 2 (or if the CD-ROM program has been "uninstalled", e.g., the video parameters have been deleted from the hard disk 8), then a test video is loaded and played at full screen size (step 216). By examining the operation of the computer 2 during playback of the video, the optimum size and/or frame rate is determined for this computer 2 (step 218). This information is saved on the hard disk 8, e.g., in a cdnav.ini or the WIN.INI file, as discussed above (step 220) and the video is played back according to these parameters.

The operation of the CD-ROM program then proceeds as normal, without the need for any further information or programs to be loaded onto or saved on the hard disk 8 of the computer 2 (step 222).

If desirable to speed up the operation of the CD-ROM program, data and programs may be stored on the hard disk 8. However, this is not required by the present invention.

The following pseudo code describes in further detail the operation of the present invention in a Windows 95 or Windows 3.1 environment, i.e., for a CD-ROM disk that can operate in either such environment.

1. START UP
If ( Operating system is Win95 ) then
   If ( CD-ROM Auto insert notification is enabled ) then
      Operating system runs autorun.inf file that executes Win95.exe
   Else
      User has to run Win95.exe
Else
   User has to run Win31.exe Comment and Explanation: The Windows 95 operating system has an AutoPlay feature which allows the operating system to automatically operate a CD-ROM. When a CD-ROM disk is placed in the CD-ROM drive, the Windows 95 operating system looks for a file called autorun.inf on the CD-ROM disk. If the file is found, Windows 95 will open it and carry out its instructions, which (according to the Microsoft Dictionary at p. 37) "are usually to set up an application from the CD-ROM on the computer's hard disk or to start the application once it has been installed."

Here, if the user loads the CD-ROM on a computer 2 that is using the Windows 95 operating system and has AutoPlay turned on, then the operating system runs the autorun.inf file which in turn runs a Win95.exe file stored on the CD-ROM. If the AutoPlay feature has been turned off, the user will manually run Win95.exe off the CD-ROM, e.g., from Start/Run on the Control Bar.

If the computer is using Windows 3.1, the user will manually run Win31.exe from the CD-ROM.

Now that the program is running, the following steps take place:

2. Set Up
A black fullscreen window is created and drawn to the screen
A window of size 0 is created—this is known as the Media Window.
Scan all CD-ROM drives looking for a file /mnu/data.mnu
If (file found ) then
   ProjectRoot is the CD_ROM root directory
Else
   Display error message and exit on confirmation
Allocate a block of memory for the graphics display
Resize the Media Window to 640×480
Center the window on the screen
Get the number of bits used to display a pixel
If this number is less than 8 then
   Display error message "Display error! This program requires your display to be set to 256 colours or more Please set your display accordingly in the Control Panel" Exit
Create the path to the Data file—data.mnu
Read the contents of the file to memory
If an error occurs then
   Display an error message and exit Comment and Explanation: The Media Window is a window that can display to the user the graphical user interface to allow the user to navigate the CD-ROM program. From the Media Window, the user can, for example, select videos, cause images to be displayed and move to different assets on the CD-ROM (e.g., video, sound and images). Initially, during set-up, the Media Window is created but not displayed. Later, it is resized to 640×480.

The data.mnu file is a data file (or script) that comprises the description of the navigational paths and hotspots for the CD-ROM program, as well as the names of the audio, images and video files that can be played from the CD-ROM program. Typically, an authoring tool is used by a multimedia program developer to produce the data.mnu file. According to the present invention, the data.mnu file is stored on the CD-ROM disk.

A block of memory in RAM 6 is allocated for the graphics display. This is done "up front" so time is not wasted later when the CD-ROM program is in use. Graphics files are read into this buffer before display.

An operating system command is used to return the number of bits to display a pixel. This is used to determine the number of colors in the display.

3. Audio Test
Load the name of the audio test file from the Data File (data.mnu)
Create a path to the test audio file and try and play it
If ( Audio file could not be opened or played ) then
   Display Error message "MCI Audio Error! Audio Driver not responding correctly.\r\nPlease install sound card and its drivers"
   exit Comment and Explanation: The audio test determines whether the sound card and audio drivers are properly installed by attempting to play a test audio file. The test audio file can be, for example, introduction music or a welcome message. "MCI" is the term for media control interface, which is a part of the Windows application programming interface that enables a program to control multimedia devices.

4. Load Custom Cursors
Load the names of the custom cursors from the Data File
Create the custom cursors
If error occurs then
   Display error message and exit Comment and Explanation: A multimedia program may use custom cursors. A cursor is a special onscreen indicator or icon, such as a blinking line or an arrow, that marks the place at where keystrokes appear when typed or that represents the position of the mouse. A multimedia developer may wish to use customized cursors for a multimedia program, e.g., a wrench shaped cursor for an automotive training CD-ROM program or coin shaped cursor for a financial CD-ROM program.

5. Scale Video
When get first paint message then:
   Try and get the cdnav.ini file and get the VideoX size
   If ( file not found ) then
      "Display message Please wait while the speed of video playback on your machine is assessed"
      Load the test video
      Play the video fullscreen
      Get the number of frames skipped
      Scale the video down to min size according to Number of frames skipped
      Save the VideoX size to the cdnav.ini file Normal program function now continues Comment and Explanation: When the operating system sends the first screen paint message to the screen, this signifies to the present invention that parameters for the running of future videos now can be determined.

The CD-ROM program will search for a file called cdnav.ini located on the hard disk 8. The cdnav.ini file comprises the frame size for videos that are to be played by the CD-ROM program. In the representative embodiment, the frame size comprises the length of the X side of the video; the length of the Y side can be determined from the X side length so as to maintain the same aspect ratio. This information was determined, and the cdnav.ini file written to the hard disk 8, the first time that this CD-ROM program was run on this computer 2. If the cdnav.ini file is not found by the CD-ROM program, then this indicates that this is the first time that this CD-ROM program has been run on this computer 2.

In an alternative embodiment, the information that is stored in the cdnav.ini file instead can be stored in the WIN.INI file. Typically, only one line of the WIN.INI file is used to store the information.

Thus, the only information, data or program stored on the hard disk 8 by the CD-ROM program during the load and run process is the cdnav.ini data file or the single line of the WIN.INI file. In the representative embodiment, this information comprises only one number, i.e., the length of the X side of the video.

If this is the first time that this CD-ROM program is run on this computer 2, then the CD-ROM program runs a test to determine the optimum frame size for any video that is o be played by the CD-ROM program on this computer 2. A test video is loaded and run, at fullscreen size. The number of frames lost is measured to determine the appropriate frame size for this computer 2. The frame size is determined so that it is as large as possible, so that the video can be played back as fast as desired without skipping video frames. (If the video frame size is set too large, frames may be skipped when the video is run at the desired frame rate.) This step does not require identification of the components of the computer 2. What is considered is the characteristics of the computer 2 in actual operation when playing video. The frame size (e.g., length of X side of the frame) is stored in the cdnav.ini or WIN.INI file, as explained above.

Optional Authoring Feature

The present invention includes an optional feature to assist multimedia developers to test CD-ROM programs that are under development. The optional feature allows the developer to run the CD-ROM program off the hard disk 8 during the development stage. Parameters are stored in the command line. The following is the full pseudo code including the optional authoring feature.

```
If ( Operating system is Win95 ) then
    If ( CD-ROM Auto insert notification is enabled ) then
        Operating system runs autorun.inf file that executes
            Win95.exe
    Else
        User has to run Win95.exe
Else
    User has to run Win31.exe
(Program now running )
A black fullscreen window is created and drawn to the screen
A window of size 0 is crated - this is known as the Media Window
Get the command line parameters
If ( parameter "HARD" is set ) then
    Set HardDrive = true
```

-continued

```
If ( parameter "HOTSHOW" is set ) then
    Set HotHighShow = true
If ( parameter "XPERCENT" is set ) then
    Get Xpercentage value and calculate the Video X dimension
    Check that Video X dimension is within allowable range
    Calculate Video Y dimension from Video X dimension keeping
        aspect ratio the same
If Harddrive = true then
    ProjectRoot is the directory of the executable
Else
    Scan all CD-ROM drives looking for a file /mnu/data.mnu
    If ( file found ) then
        ProjectRoot is the CD_ROM root directory
    Else
        Display error message and exit on confirmation
Allocate a block of memory for the graphics display
Resize the Media Window to 640 × 480
Center the window on the screen
Get the number of bits used to display a pixel
If this number is less than 8 then
    Display error message "Display error! This program requires
        your display to be set to 256 colours or more Please set your
        display accordingly in the Control Panel"
    Exit
Create the path to the Data file - data.mnu
Read the contents of the file to memory
If an error occurs then
    Display an error message and exit
Load the name of the audio test file from the Data File
Create a path to the test audio file and try and play it
If ( Audio file could not be opened or played ) then
    Display Error message "MCI Audio Error! Audio Driver not
        responding correctly.\r\nPlease install sound card and its
        drivers"
    exit
Load the names of the custom cursors from the Data File
Create the custom cursors
If error occurs then
    Display error message and exit
When get first paint message then
    If Video size not set by command line parameters
        Try and get the cdnav.ini file and get the VideoX size
        If ( file not found ) then
            "Display message Please wait while the speed of
                video playback on your machine is assessed"
            Load the test video
            Play the video fullscreen
            Get the number of frames skipped
            Scale the video down to min size according to
                Number of frames skipped
            Save the VideoX size to the cdnav.ini file
Normal program function now continues
```

Modules and Components

Figure 3:
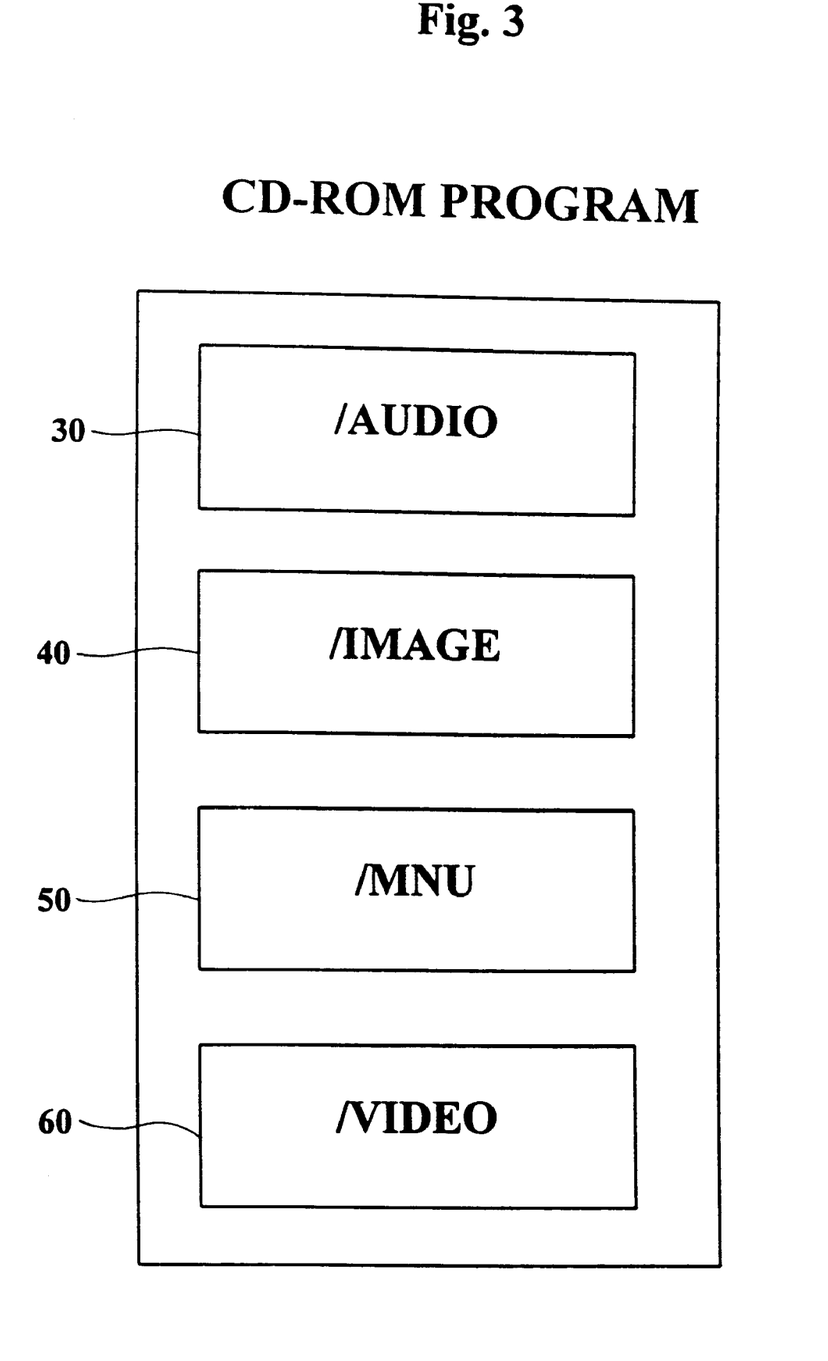
FIG. 3 is an illustration of some of the components stored on the CD-ROM disk of the present invention.

The present invention can be implemented in computer code and stored on a disk, such as a CD-ROM. The computer code is processed by the processor 4 of the computer 2. According to the representative embodiment of the present invention, the CD-ROM disk is divided into directories, which store the following components of the present invention as shown in FIG. 3:

/AUDIO/ 30

The .wav files for the CD-ROM program

/IMAGE/ 40

The .img files for the CD-ROM program

These files are custom BMP files that comprise the main image and the hotspot images in one file, as well as the custom cursor files.

/MNU/ 50

The data.mnu file that comprise the navigation and asset description information.

/VIDEO/ 60

The mpg files for the CD-ROM program.

The files and directory structure illustrated in FIG. 3 can be created using an authoring program.

The representative embodiment of the present invention uses the Compcore Multimedia MPEG Video API to play video. Thus, there is no need for any user video MCI to be installed on the computer 2. This API uses the following DLL's: CCMPEG.DLL, CMPEGW.DLL, SOFTPEG.DLL, and SOFTPEG3.DLL. These DLL's are in the same directory on the CD-ROM as the Win95.exe and Win31.exe programs. There is no need to copy these .DLL files from the CD-ROM to the hard disk 8, since the operating system treats reading from the CD-ROM the same reading from the hard disk 8. The most recent version of the Compcore Multimedia Video API should be used, which will support Window NT Version 4.0.

What is claimed is:

1. A method for using and running a CD-ROM computer program on a computer having an operating system, a CD-ROM drive and a hard disk without installing the CD-ROM computer program on the hard disk, the CD-ROM computer program stored on a CD-ROM disk, the method comprising the steps of:

executing a program stored on the CD-ROM disk;

determining if the CD-ROM computer program has previously run on the computer;

if the CD-ROM computer program has previously run on the computer, (a) retrieving from the hard disk a video frame size parameter, and (b) running the CD-ROM computer program on the computer wherein video playback is according to the video frame size parameter; and if the CD-ROM computer program has not previously run on the computer, (a) running a test video segment on the computer, (b) while running the test video segment, determining an optimum video frame size for the computer, (c) storing the optimum video frame size on the hard disk, and (d) running the CD-ROM computer program on the computer wherein video playback is according to the optimum video frame size.

2. The method of claim 1 wherein the computer is a multimedia personal computer.

3. The method of claim 2 wherein the CD-ROM computer program is a multimedia computer program.

4. The method of claim 1 wherein the step of storing the optimum video frame size on the hard disk further comprises the step of storing the optimum video frame size in an initialization file of operating system on the hard disk.

5. The method of claim 4 wherein the step of determining if the CD-ROM computer program has previously run on the computer comprises the step of examining the initialization file of operating system on the hard disk.

6. The method of claim 5 wherein the step of retrieving from the hard disk a video frame size parameter comprises the step of retrieving the video frame size parameter from the initialization file of operating system on the hard disk.

7. The method of claim 1 wherein the step of determining if the CD-ROM computer program has previously run on the computer comprises examining the hard disk of the computer.

8. The method of claim 1 wherein the step of storing the optimum video frame size on the hard disk further comprises the step of storing the optimum video frame size in a file on the hard disk, said file created by the CD-ROM program.

9. The method of claim 8 wherein the step of determining if the CD-ROM computer program has previously run on the computer comprises the step of examining the file on the hard disk.

10. The method of claim 9 wherein the step of retrieving from the hard disk a video frame size parameter comprises the step of retrieving the video frame size parameter from the file on the hard disk.

11. The method of claim 1 wherein the step of storing the optimum video frame size on the hard disk comprises the step of storing the optimum video frame size for future reference.

12. The method of claim 1 further comprising the step of playing an audio file to determine if a sound card and sound card drivers are installed on the computer.

13. The method of claim 1 wherein the step of running the CD-ROM computer program on the computer wherein video playback is according to the optimum video frame size further comprises running the CD-ROM computer program on the computer at a predetermined frame rate.

14. A method for using and running a multimedia computer program stored on a CD-ROM on a computer having a hard disk, the method comprising the steps of:

determining if the multimedia computer program has previously run on the computer by examining the hard disk; and if the multimedia computer program has not previously run on the computer:

(a) running a test video segment on the computer,
   (b) while running the test video segment, determining an optimum video frame size for the computer,
   (c) storing the optimum video frame size on the hard disk, and
   (d) running the multimedia computer program on the computer wherein video playback is according to the optimum video frame size.

15. A method for using and running a multimedia computer program stored on a CD-ROM on a computer having a hard disk, without writing any data or code to the hard disk, the method comprising the steps of:

loading the CD-ROM;

without user intervention, running a test video segment on the computer;

while running the test video segment, determining an optimum video frame size for the computer; and running the multimedia computer program on the computer wherein video playback is according to the optimum video frame size.

16. A system for using and running a CD-ROM computer program stored on a CD-ROM disk, comprising:

a computer having a hard disk and a CD-ROM drive;

means for determining if the CD-ROM computer program has previously run on the computer;

means for retrieving from the hard disk an optimum video frame size if the CD-ROM computer program has previously run on the computer;

means for running a test video segment on the computer if the CD-ROM computer program has not previously run on the computer;

means for determining an optimum video frame size for the computer while running the test video segment;

means for storing the optimum video frame size on the hard disk; and means for running the CD-ROM computer program on the computer wherein video playback is according to the optimum video frame size.

17. The system of claim 14 wherein the CD-ROM computer program is run without installing the CD-ROM computer program on the hard disk.

18. A system for running a computer program without modifying or adding new system resources, comprising:

a computer having a hard disk and a CD-ROM drive;

a multimedia computer program stored on a CD-ROM disk, the multimedia computer program including a module for determining if the multimedia computer program has previously run on the computer and for retrieving from the hard disk an optimum video frame size if the multimedia computer program has previously run on the computer, the module of the multimedia computer program running a test video segment on the computer if the multimedia computer program has not previously run on the computer and determining an optimum video frame size for the computer while running the test video segment, and thereafter storing the optimum video frame size on the hard disk; and means for running the multimedia computer program on the computer wherein video playback is according to the optimum video frame size.

19. A method for using and running a multimedia CD-ROM computer program on a computer having a CD-ROM drive and a hard disk without installing the CD-ROM computer program on the hard disk, the CD-ROM computer program stored on CD-ROM disk, the method comprising the steps of:

determining if the CD-ROM computer program has previously run on the computer;

if the CD-ROM computer program has previously run on the computer, (a) retrieving from the hard disk stored parameters relating to the characteristics of the computer, and (b) running the CD-ROM computer program on the computer according to the stored parameters; and if the CD-ROM computer program has not previously run on the computer, (a) running a output segment on the computer, (b) while running the test output segment, determining the characteristics of the computer, (c) storing the characteristics of the computer as parameters on the hard disk, and (d) running the CD-ROM computer program on the computer according to the determined characteristics.

20. A system for using and running a multimedia computer program stored on a CD-ROM on a computer having a hard disk, comprising:

a CD-ROM storing a multimedia computer program;

means for loading the CD-ROM on the computer;

means for running a test video segment on the computer from the CD-ROM without user intervention and without writing any data or code to the hard disk from the CD-ROM;

means for determining an optimum video frame size for the computer while running the test video segment; and means for running the multimedia computer program from the CD-ROM on the computer wherein video playback is according to the optimum video frame size;

wherein no data or code is written to the hard disk from the CD-ROM.

21. A system for using and running a multimedia computer program comprising:

a computer including a hard disk and a CD-ROM drive; and a CD-ROM storing the multimedia computer program, the multimedia computer program when loaded on the computer, runs a test video segment on the computer from the CD-ROM without user intervention and without writing any data or code to the hard disk from the CD-ROM, and determines an optimum video frame size for the computer while running the test video segment, and thereafter runs the multimedia computer program from the CD-ROM on the computer wherein video playback is according to the optimum video frame size, no data or code written to the hard disk from the CD-ROM.

22. A CD-ROM disk storing a computer program that can be executed on a computer having a CD-ROM drive and a hard disk without installing the computer program on the hard disk, the CD-ROM disk comprising instructions for:

determining if the computer program has previously run on the computer;

if the computer program has previously run on the computer, (a) retrieving from the hard disk a video frame size parameter, and (b) running the computer program on the computer wherein video playback is according to the video frame size parameter; and if the computer program has not previously run on the computer, (a) running a test video segment on the computer, (b) while running the test video segment, determining an optimum video frame size for the computer, (c) storing the optimum video frame size on the hard disk, and (d) running the computer program on the computer wherein video playback is according to the optimum video frame size.

* * * * *